Dec. 7, 1937.  M. N. PENNY  2,101,751
CLEANER FOR CONVEYERS
Filed March 14, 1936   2 Sheets-Sheet 1

Myrl N. Penny, INVENTOR
BY Victor J. Evans & Co.
ATTORNEY

Dec. 7, 1937.     M. N. PENNY     2,101,751
CLEANER FOR CONVEYERS
Filed March 14, 1936     2 Sheets-Sheet 2
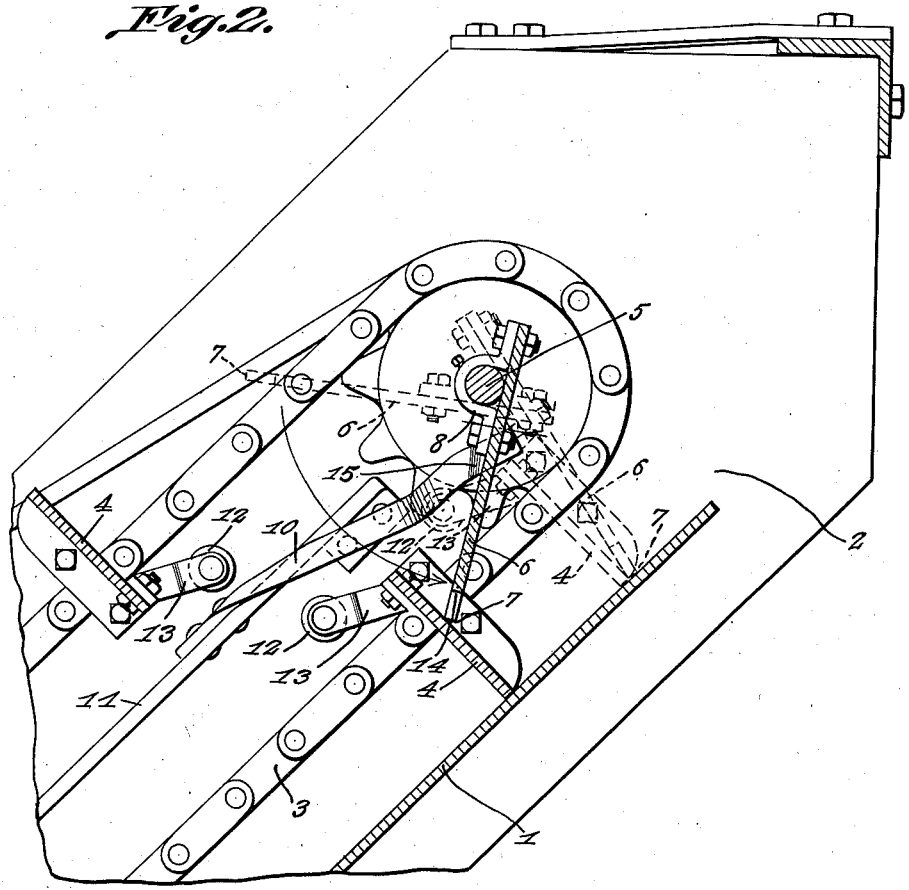

Patented Dec. 7, 1937

2,101,751

UNITED STATES PATENT OFFICE 2,101,751

CLEANER FOR CONVEYERS

Myrl N. Penny, Lawrence, Kans.

Application March 14, 1936, Serial No. 68,961

3 Claims. (Cl. 198—229)

This invention relates to cleaners for conveyers and has for the primary object the provision of a simple and inexpensive device of this character which may be readily adapted to a conveyer for automatically removing materials which may adhere to the conveying means of said conveyer as the means nears the discharge of the conveyer, obviating the customary practice of manually removing such material from the conveying means and which frequently requires stopping of the conveyer and the loss of time and the manual power required for the cleaning operation.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary plan view showing the discharge end of a conventional conveyer equipped with a cleaner constructed in accordance with my invention.

Figure 2 is a sectional view taken on the line 2—2 of Figure 1.

Figure 4 is a side elevation illustrating the cleaner.

Figure 1:
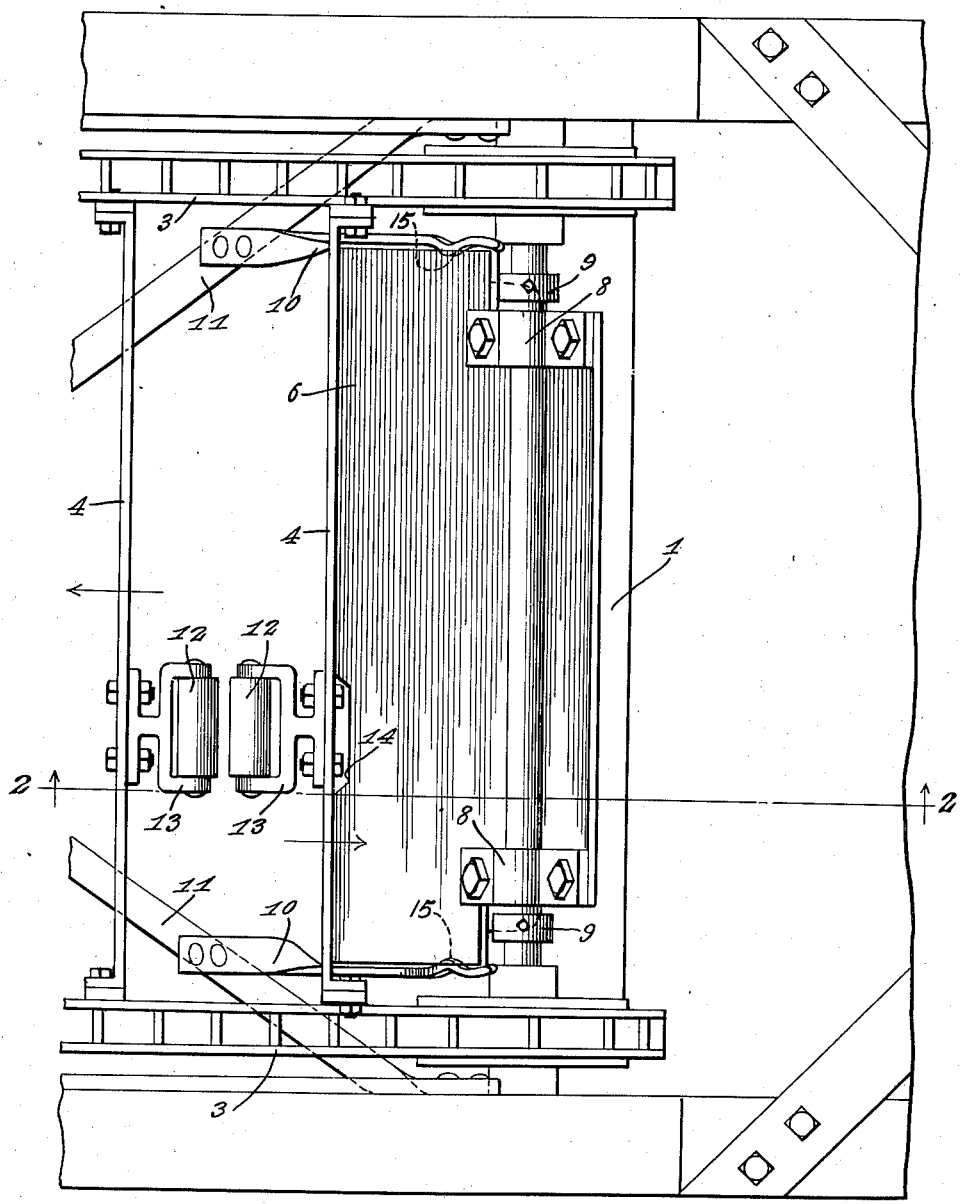
Figure 3:
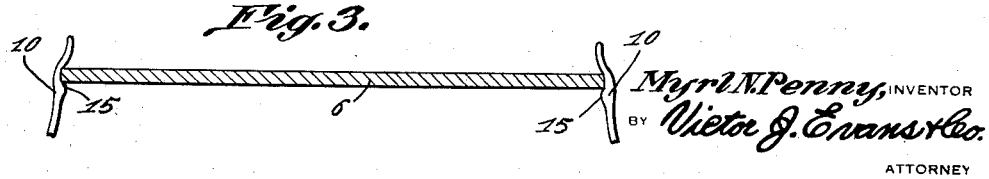
Figure 3 is a fragmentary sectional view showing the means of retaining the cleaner in an operative position to be engaged by the conveying means as the latter nears the discharge end of the conveyer.

Referring in detail to the drawings, the numeral 1 indicates a conventional type of conveyer wherein the discharge end is indicated by the character 2. The conveyer has a conveying means of the endless type, the conveying means including sprocket chains 3 mounted on a sprocket wheel and equipped with flights 4. The sprocket wheels or gears are secured to shafts 5 journaled to the framework of the conveyer. The flights cooperate with the framework of the conveyer for moving materials from the receiving end of the conveyer to the discharge end and when such materials are of an absorbent nature and contain moisture frequently adhere to the flights and comparatively large masses fail to discharge from the conveyer so that after operation over a period of time the conveyer becomes clogged necessitating stopping of the conveyer in order that the flights be manually cleaned from the materials adhering thereto, requiring loss of time and a large expenditure of manual effort.

In order to overcome this objection to conveyers my invention when adapted thereto will automatically clean each flight of the conveying means as it passes the discharge end of the conveyer.

My invention is adapted to the shaft 5 of the conveying means which is located adjacent the discharge end of the conveyer and consists of a scraper 6 in the form of a blade having a scraping edge 7 and its opposite edge cut away and to which are secured journals 8 receiving said shaft 5. The scraper 6 due to the journals 8 turns free of the shaft. Suitable stop collars 9 are applied to the shaft for limiting the endwise movement of the scraper. The normal operative position of the scraper or blade is shown in full lines in Figure 2 and is releasably supported in this position by spring arms 10 secured to braces 11 of the conveyer frame. The scraper or blade maintains this position until engaged by a flight and as the flight advances towards the discharge end of the conveyer the scraping edge 7 moves over the face of the flight removing materials which may adhere thereto so that when the flight passes the discharge end it is clean of any material. The scraper or blade continues to follow the flight until said flight moves away from said blade or scraper on its return run of the conveyer. The blade or scraper being journaled on the shaft 5 then gravitates into engagement with the spring arms 10 where it is retained in the operative position to engage the next flight.

The spring arms 10 are provided with spaced shoulders 15 and the shoulders of each arm cooperate in defining a notch in which the blade or scraper seats when moving into operative position. The blade or scraper remains in the seats of the arms until positive force is applied thereto by a flight coming in contact therewith.

In some instances the flights of the conveying means are equipped with guide rollers 12 being mounted to the flights by brackets 13. The brackets are secured to the flights by bolts and in order that the blade or scraper will not catch into the bolts a notch 14 is provided in the scraping edge 7 of the blade or scraper.

While I have described my invention used in connection with a conveyer of a specific construction, it is to be understood that the invention may be readily adapted to other types of conveyers.

Having described the invention, I claim:

1. In combination with a conveyer having an endless conveying means including flights, a supporting shaft for said conveying means located adjacent the discharge end of the conveyer, a blade journaled to said shaft and movable about the latter when engaged by a flight, and means temporarily retaining the blade in a position to contact the flight as the latter nears the discharge end and moved over said flight with frictional contact therewith to remove foreign matter adhering to the flight.

2. In combination with a conveyer having an endless conveying means including flights and a supporting shaft located adjacent the discharge end of said conveyer, a blade journaled on said shaft and adapted to rotate on said shaft when engaged by a flight for the purpose of removing materials adhering to the flight and permitting said flight to pass the blade on its return run of the conveyer, and spring means releasably retaining the blade in a position to be engaged by a flight as it nears the discharge end.

3. In combination with a conveyer having an endless conveying means including flights and a supporting shaft located adjacent the discharge end of said conveyer, a blade journaled on said shaft and adapted to rotate on said shaft when engaged by a flight for the purpose of removing materials adhering to the flight and permitting said flight to pass the blade on its return run of the conveyer, spring arms secured to the conveyer to engage the blade for releasably retaining the blade in a position to contact a flight as it nears the discharge end.

MYRL N. PENNY.